(12) United States Patent
Poulsen

(10) Patent No.: US 7,284,873 B2
(45) Date of Patent: Oct. 23, 2007

(54) FLUID COLUMN PROJECTION APPARATUS AND METHOD

(75) Inventor: Peter D. Poulsen, Grants Pass, OR (US)

(73) Assignee: Merlin Technology Limited Liability Company, Grants Pass, OR (US)

( * ) Notice: Subject to any disclaimer, the term of this patent is extended or adjusted under 35 U.S.C. 154(b) by 109 days.

(21) Appl. No.: 11/235,439

(22) Filed: Sep. 26, 2005

(65) Prior Publication Data

US 2006/0072336 A1    Apr. 6, 2006

Related U.S. Application Data

(60) Provisional application No. 60/613,913, filed on Sep. 28, 2004.

(51) Int. Cl.
*F21V 33/00*    (2006.01)
(52) U.S. Cl. .................... 362/96; 362/101; 362/149
(58) Field of Classification Search ............ 362/96, 362/101, 149, 801, 372, 374; 261/79.2, 81, 261/142
See application file for complete search history.

(56) References Cited

U.S. PATENT DOCUMENTS

| 1,535,486 | A | * | 4/1925 | Lundy | 219/538 |
| 4,965,490 | A | * | 10/1990 | Ratner | 313/569 |
| 6,631,999 | B1 | * | 10/2003 | Chang | 362/96 |
| 6,676,271 | B2 | * | 1/2004 | Kohn et al. | 362/101 |

* cited by examiner

*Primary Examiner*—John Anthony Ward
(74) *Attorney, Agent, or Firm*—Martin & Associates, LLC; Derek P. Martin

(57) ABSTRACT

A fluid column projection apparatus and method provide a unique optical effect by providing a plurality of scoops that direct fluid into a hollow chamber. The fluid preferably contains one or more types of light-scattering material. The fluid exits the hollow chamber in a manner that projects the fluid to a considerable distance past the hollow chamber. The hollow chamber may be lit, or an external light source may illuminate the fluid, thereby providing a unique and pleasing optical effect in the form of a column of light.

23 Claims, 9 Drawing Sheets

FLUID COLUMN PROJECTION APPARATUS AND METHOD

RELATED APPLICATION

This patent application claims the benefit of U.S. Provisional Application No. 60/613,913 entitled "A FLUID COLUMN PROJECTION SYSTEM", filed on Sep. 28, 2004, which is incorporated herein by reference.

BACKGROUND OF THE INVENTION

1. Technical Field

This invention generally relates to optical devices, and more specifically relates to optical devices that incorporate fluid flow.

2. Background Art

Many different mechanisms and methods have been used over the years to produce optical effects. For example, neon lights have been in widespread use for decades. Disco balls have many small mirrorlettes disposed on the outer edge of a sphere. When a light, such as a spotlight, is directed to a disco ball, the light is reflected by each mirrorlette, resulting in a large number of spots that are all reflected at a slightly different angle, flooding a dance floor below the disco ball with light dots. Lights with multicolor lenses have been used to illuminate flocked Christmas trees. For example, a single circular lens may be divided into four quandrants of different colors. The lens may slowly be rotated by a gearhead motor so that each of the different colors is rotated to be aligned over a light source, such as an incandescent bulb. The result is a flocked (white) Christmas tree that changes between four different colors according to the color of the lens portion that is disposed over the light source. Many other optical effects are known in the art. The present invention is directed to a new system and method for producing an optical effect in a vertical column.

DISCLOSURE OF INVENTION

According to the preferred embodiments, a fluid column projection apparatus and method provide a unique optical effect by providing a plurality of scoops that direct fluid into a hollow chamber. The fluid preferably contains one or more types of light-scattering material. The fluid exits the hollow chamber in a manner that projects the fluid to a considerable distance past the hollow chamber. The hollow chamber may be lit, or an external light source may illuminate the fluid, thereby providing a unique and pleasing optical effect in the form of a column of light.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

The preferred embodiments provide a fluid column that provides a pleasing and attractive optical effect. The fluid column projection apparatus includes a hollow chamber, with a rotational assembly below the hollow chamber. The rotational assembly includes a plurality of scoops, with each scoop having an input end and a discharge end, where the input ends of the scoops are below the hollow chamber and the discharge ends of the scoops are coupled to the hollow chamber. Rotation of the rotational assembly causes the scoops to direct fluid into the input ends and out the discharge ends. The fluid is then projected out of the hollow chamber. One or more light sources may illuminate the hollow chamber and/or the fluid exiting the hollow chamber. The fluid may include light dispersing material to enhance the optical effect. The result is a vertical column that is projected a considerable distance above the hollow chamber, thereby providing a column of light.

Figure 1:
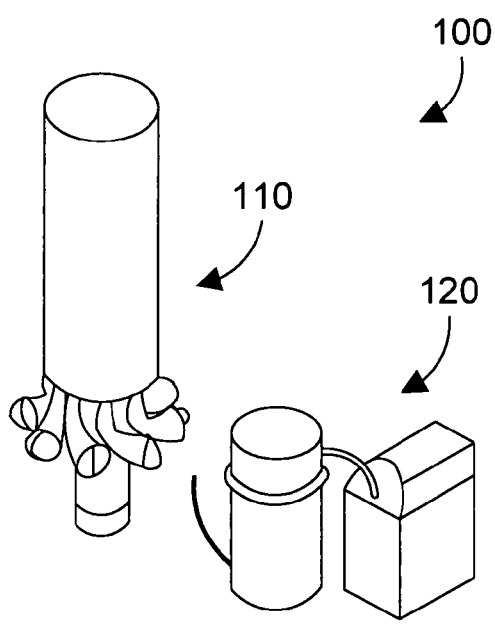
FIG. 1 is a perspective view of a fluid column projection apparatus in accordance with the preferred embodiments.
Figure 2:
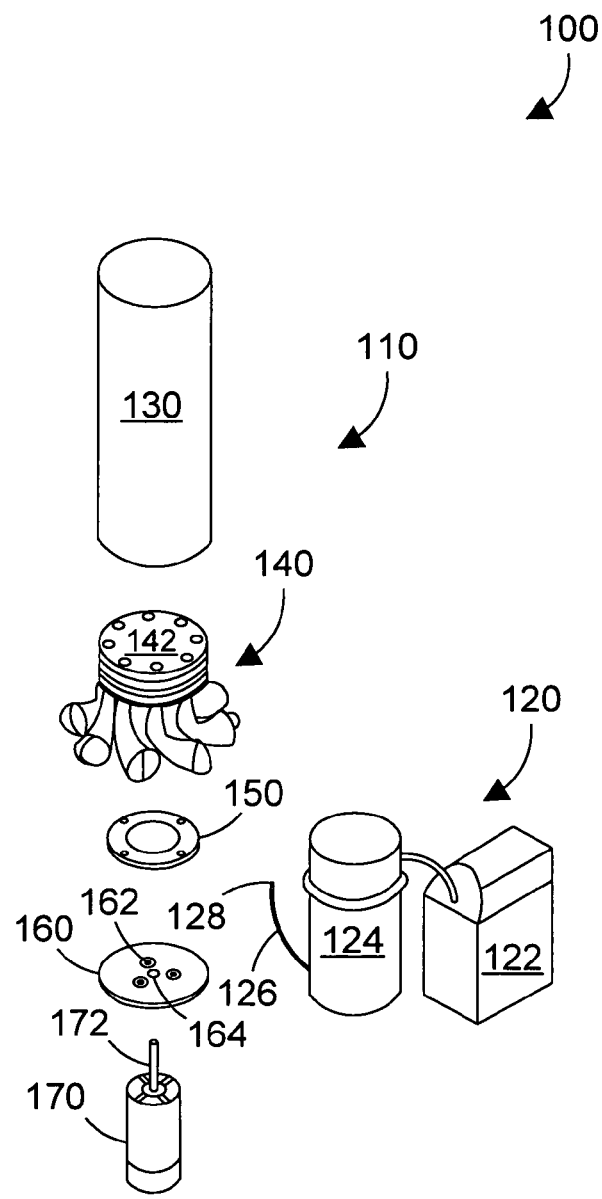
FIG. 2 is an exploded view of the apparatus in FIG. 1.

Referring to FIG. 1, a fluid column projection apparatus 100 in accordance with the preferred embodiments includes a fluid directing assembly 110 and a fluid source assembly 120. FIG. 2 shows an exploded view of the fluid directing assembly 110. The fluid directing assembly 110 includes a hollow chamber 130, a rotational assembly 140, a bearing plate 150, a light plate 160, and a motor 170. The hollow chamber 130 may be opaque, or may be translucent or transparent. If the hollow chamber 130 is in a visible location, the hollow chamber 130 could be translucent or transparent so the fluid within the hollow chamber 130 is visible. In fact, the hollow chamber 130 could be transparent, quite tall, and closed-end, confining the light column within the hollow chamber 130. However, one of the desired characteristics of the apparatus 100 is the ability to project a column of light a considerable distance above the hollow chamber 130. Thus, in some applications the hollow chamber 130 will not be in a visible location, or viewing the light column within the hollow chamber 130 may not be desirable. In these applications, the hollow chamber 130 could be opaque. Note that the hollow chamber 130 could also be made of varying materials for a desired optical effect within the hollow chamber 130. For example, the hollow chamber 130 could be formed from alternating bands of opaque and translucent material, providing a striped effect. The hollow chamber 130 can include any suitable configuration of opaque, translucent and/or transparent materials.

Figure 4:
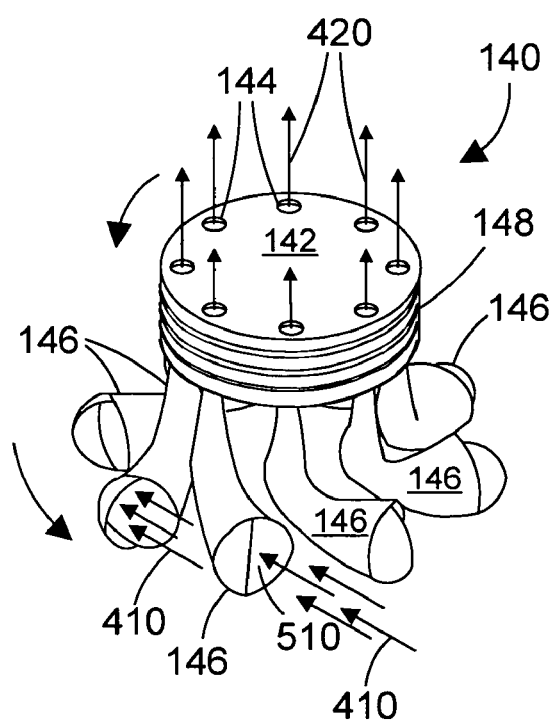
FIG. 4 is a perspective view of the rotational assembly for the apparatus in FIG. 1.
Figure 5:
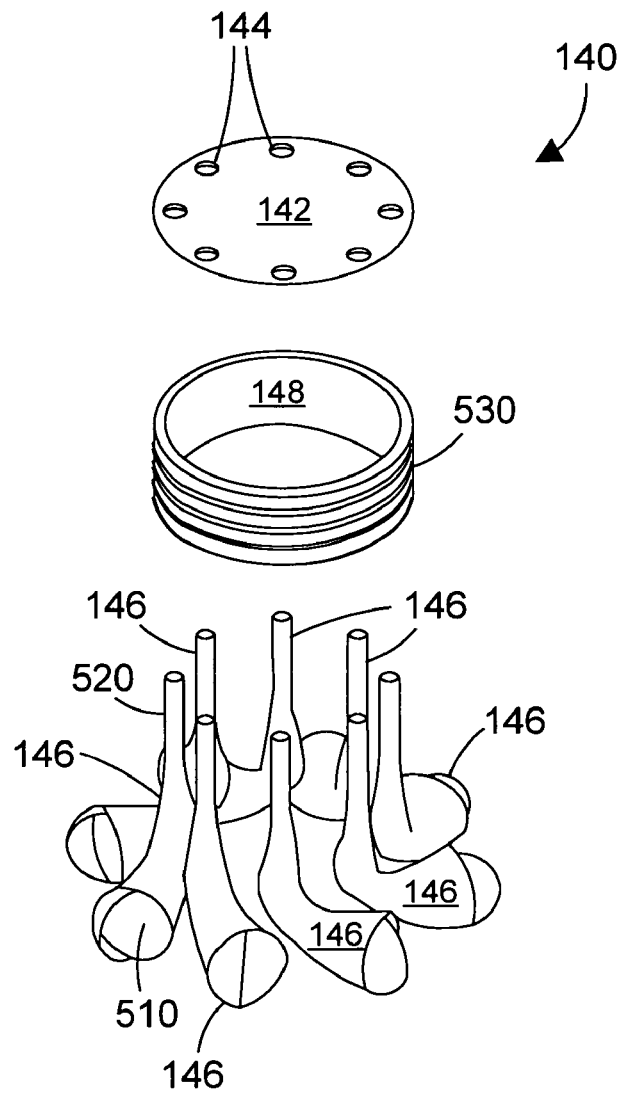
FIG. 5 is an exploded view of the rotational assembly in FIG. 4.

Details of the rotational assembly 140 in FIG. 2 are shown in FIGS. 4 and 5. The rotational assembly 140 includes a mounting plate 142 that includes a plurality of holes 144, a plurality of scoops 146 and a bearing collar 148. The scoops 146 have lower portions 510 that are the input ends of the scoops, and upper 520 portions that are the discharge ends of the scoops, which are coupled to the plurality of holes 144 so the discharge ends 520 of the scoops are coupled to the hollow chamber 130.

Referring back to FIG. 1, the mounting plate 142 is preferably transparent or translucent to allow light from the light plate 160 to shine through the mounting plate 142 into the hollow chamber 130. The bearing plate 150 is the type of bearing plate used in a "lazy Susan", with top and bottom plates separated by ball bearings that allow rotation of the top plate with respect to the bottom plate. The bearing plate 150 is preferably sized to fit inside the circle defined by the discharge ends 520 of the scoops 146, and is preferably attached to the mounting plate 142. The lower plate of the bearing plate 150 rests on or is coupled to the light plate 160 so that light plate 160 supports the weight of the rotational assembly 140 through the bearing plate 150.

The light plate 160 preferably includes one or more light sources 162, and a hole 164 through which a motor shaft 172 passes and connects to the rotational assembly 140. Note that the light plate 160 is preferably stationary, as shown in the configuration in FIG. 2. Note, however, that the light plate could also rotate as the motor turns within the scope of the preferred embodiments. Light sources 162 could be any suitable illuminating device, including bulbs, lasers, light-emitting diodes (LEDs), organic LEDs (OLEDs), electroluminescent (EL) panels, fluorescent tubes, etc. The light sources 162 could have no color, a fixed color, variable color, or any combination thereof. In addition, the light sources 162 can have, individually or collectively, any brightness and/or modulation within the scope of the preferred embodiments. In addition, while the light sources 162 are shown mounted in the light plate 160, the preferred embodiments expressly extend to any suitable light source that may shine light on the hollow chamber 130 and/or on the fluid column exiting the hollow chamber 130.

The motor 170 is any suitable type of motor for turning the rotational assembly 140 at a desired speed. Note that the desired speed could be quite slow, or could be very fast, depending upon the desired optical effect. Shaft 172 of motor 170 passes through a hole 164 in the light plate 160, and is coupled to the mounting plate 142 such that rotation of the motor shaft 172 causes rotation of the rotational assembly 140. The coupling between the motor shaft 172 and mounting plate 142 is not shown, but any suitable coupling could be used within the scope of the preferred embodiments. Note that forced and/or pressurized air can be used as the motive force for creation of the rotation of the rotational assembly 140, either independently or in conjunction with the use of the motor 170.

The fluid source assembly 120 includes a fluid source 122, a compressor 124, a discharge tube 126, and an aerosol-generating device 128. The fluid source 122 shown in FIG. 2 is a simple reservoir that holds a desired volume of fluid. The compressor 124 draws fluid from the fluid source 122, pressurizes the fluid, and outputs the pressurized fluid out the discharge tube 126 and aerosol-generating device 128. In one specific implementation, the fluid in the fluid source 122 is a liquid, and the aerosol-generating device 128 is an atomizer that produces a fine mist from the liquid. Note that the scoops 146 thus collect two different fluids in the configuration shown in FIGS. 1 and 2: 1) ambient air, and 2) atomized liquid. The preferred embodiments expressly extend to any suitable number or type of fluids.

Figure 3:
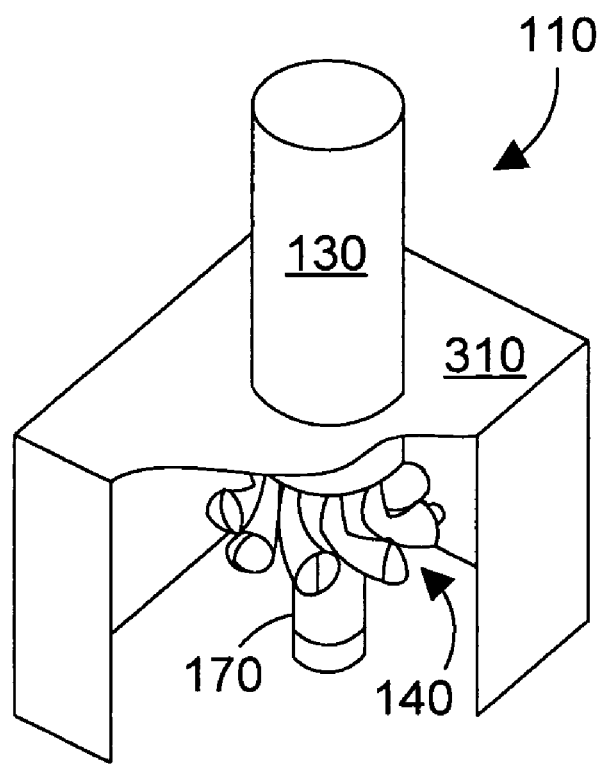
FIG. 3 is a perspective view of the apparatus of FIG. 1 with a lower enclosure shown cut-away to view the apparatus within the enclosure.

FIG. 3 shows the fluid directing assembly 110 with the rotational assembly 140 housed within a suitable housing 310. In a first implementation, the hollow chamber 130 is coupled to the housing 310, with the rotational assembly 140 rotating within the hollow chamber 130. In a second implementation, the hollow chamber 130 is not coupled to the housing 310, but rotates as the rotational assembly 140 rotates. Note that enclosure 310 preferably includes one or more air vents (not shown) that supply ambient air to the scoops in the rotational assembly.

Referring again to FIGS. 4 and 5, the mounting plate 142 in the rotational assembly 140 includes a plurality of holes 144. The mounting plate is connected to the plurality of scoops 146 that each have an input end 510 and a discharge end 520. The discharge ends 520 are preferably press-fit into the holes 144 in the mounting plate 142. In the alternative, any other suitable connection means may be used for securing the scoops 146 to the mounting plate 142. For example, the discharge ends 520 could be externally threaded so a first nut may be placed below the mounting plate 142 and a second nut may be placed above the mounting plate 142, thereby captivating the mounting plate 142 between the two nuts and securing the scoop 146 to the mounting plate 142. The plurality of scoops 146 are thus fixedly coupled to the mounting plate 142 using any suitable connection means.

A bearing ring 148 is attached to the mounting plate 142, and encloses the discharge ends 520 of the scoops 146. The bearing ring 148 includes one or more slots 530 that serve as raceways for ball bearings. These slots 530 are preferably loaded with ball bearings before the rotational assembly 140 is slid within the hollow chamber 130, thereby allowing the rotational assembly 140 to rotate with respect to the hollow chamber 130 with a minimum of friction and resistance.

Figure 6:
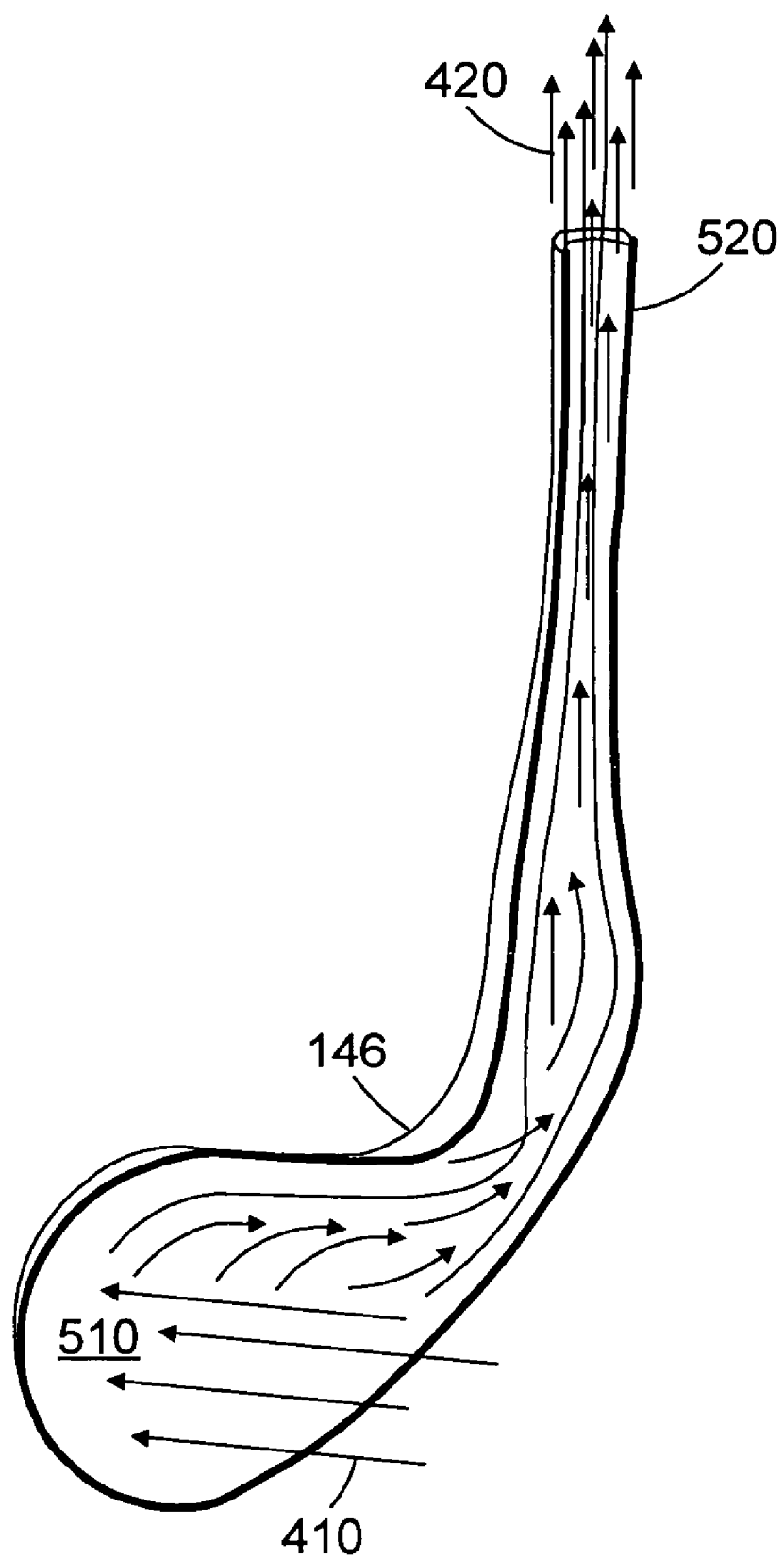
FIG. 6 is a cross-sectional view of a scoop within the scope of the preferred embodiments.

As the rotational assembly 140 rotates as shown in FIG. 4, the input ends 510 of the scoops catch fluid 410, and direct the fluid to the discharge ends 520 and out the discharge ends, as shown at 420 in FIGS. 4 and 6. Because the cross-sectional area of the input ends 510 is substantially larger than the cross-sectional area of the discharge ends 520, a pressure differential is established that produces a much higher velocity at the discharge end 520, resulting in the fluid shooting out of the discharge ends as shown at 420 in FIGS. 4 and 6 into the hollow chamber much more quickly than the fluid 410 enters the input ends 510. The fluid can thus be projected a considerable distance away from the rotational assembly 140. The result is a flow of fluid that produces a column of light as the rotational assembly 140 rotates. Note that the peripheral placement of the holes 144 may produce a low-pressure region along the center of the hollow chamber 130, thereby producing a stabilized flow of vortex-like fluid motion.

Figure 7:
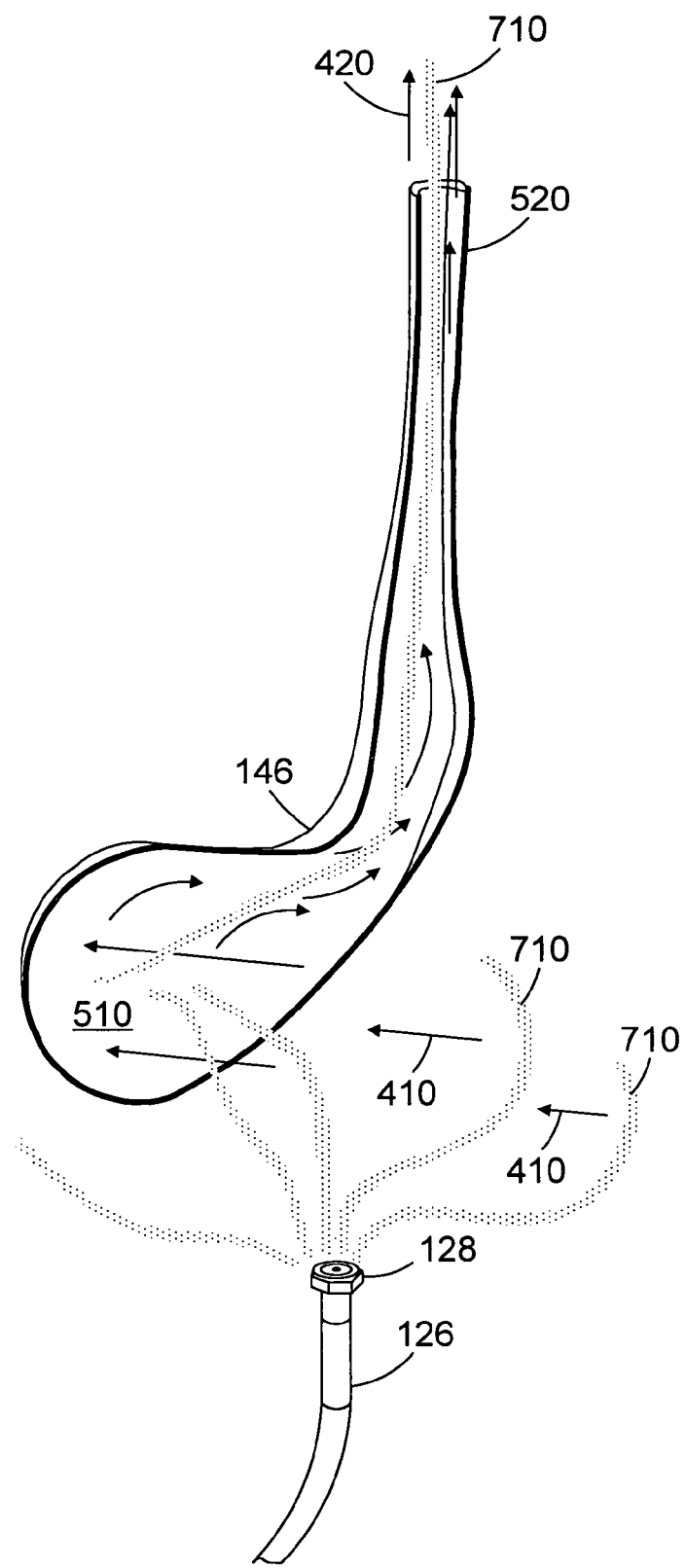
FIG. 7 illustrates how an atomized liquid is directed by the scoop of FIG. 6 from its input end to its discharge end.

FIG. 7 shows how a second fluid source may be used to increase the desired visual effect of the fluid column. We assume for this specific example that two fluids are being scooped by the scoops 146. The first fluid is air, represented in FIG. 7 by lines 410. The second fluid is an atomized liquid that is provided by the discharge tube 126 and an aerosol-generating device 128, which for this example is an atomizing nozzle. The resulting streams of atomized liquid are shown in FIG. 7 as streams 710. As the scoops 146 rotate, the scoops collects both the air 410 and the atomized liquid 710 at the input ends 510, and direct both air 420 and atomized liquid 710 out the discharge ends 520 as shown in FIG. 7. The atomized liquid could be a colored liquid that produces or enhances the desired visual effect.

Figure 8:
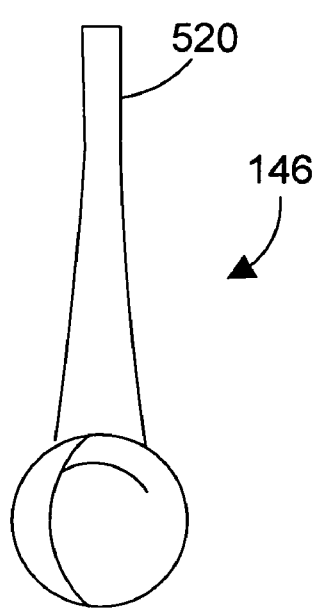
FIG. 8 is a side view of a scoop in accordance with the preferred embodiments.
Figure 9:
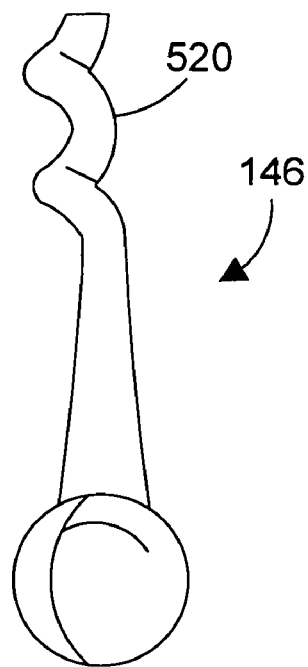
FIG. 9 is a side view of a scoop in accordance with the preferred embodiments that includes a spiral portion at the discharge end.
Figure 10:
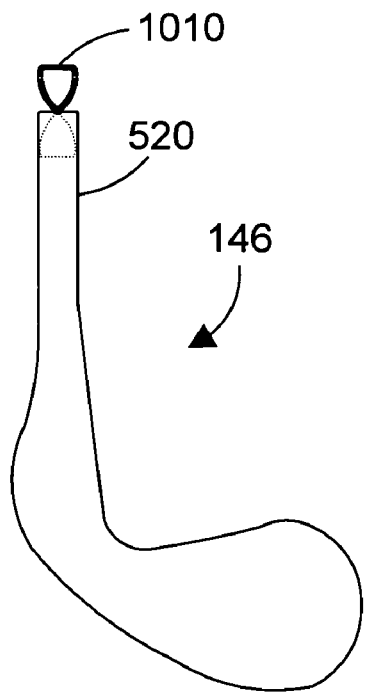
FIG. 10 is a side view of a scoop in accordance with the preferred embodiments that includes a fluid-directing device at the discharge end.
Figure 11:
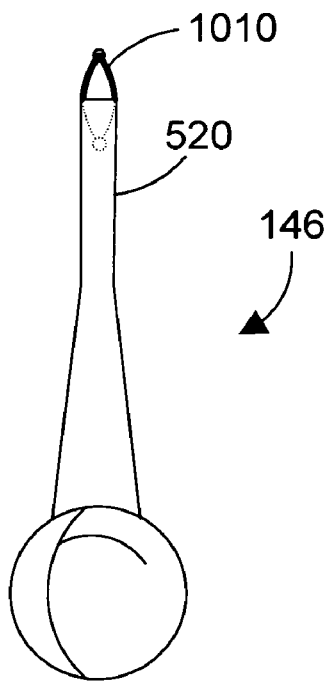
FIG. 11 is a second side view of the scoop in FIG. 10.

The scoops 146 may have any suitable shape or configuration within the scope of the preferred embodiments. Examples of sample shapes and configurations of scoops are shown in FIGS. 8-11. Referring to FIG. 8, scoop 146 may include a discharge end 520 that is mostly straight as shown. In the alternative, scoop 146 may include a discharge end 520 that includes one or more helical turns, as shown in FIG. 9. These helical turns produce a vortex action in the discharged fluid, thereby producing a different visual effect than a straight discharge end as shown in FIG. 8. The discharge end 520 may also include a fluid-directing device 1010, as shown in FIGS. 10 and 11. The fluid-directing device 1010 is a helical insert in the discharge end 520 that produces a vortex flow of fluid at the discharge end 520. Note that half of the helical insert 1010 is shown above the discharge end 520, while the other half is shown in phantom to be within the discharge end 520. One skilled in the art will recognize that many other configurations of scoops are possible, all of which are within the scope of the preferred embodiments.

Figure 12:
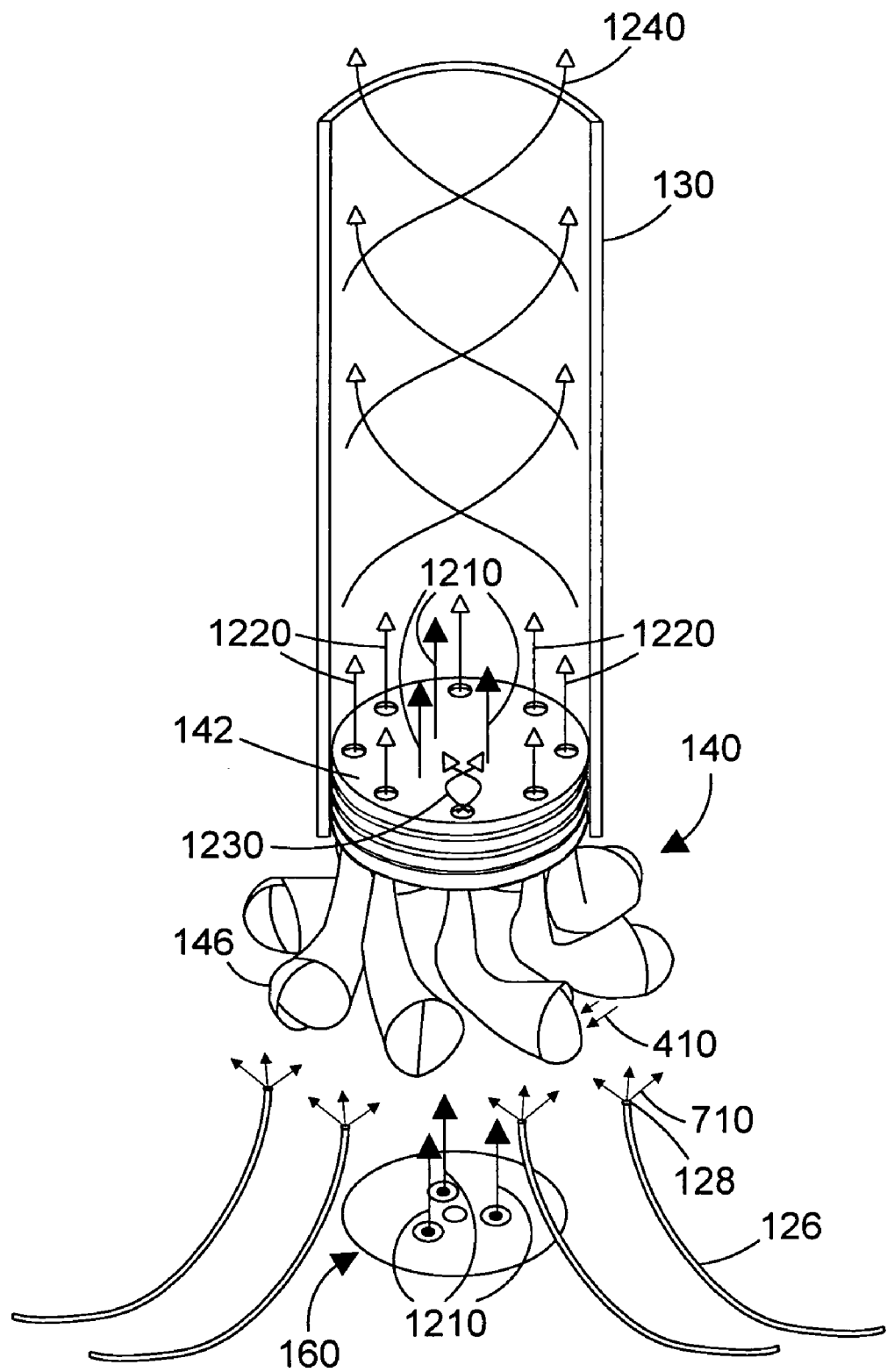
FIG. 12 is a view of parts of the apparatus in FIG. 1 with the hollow chamber cut away to show the spiral pattern of the fluid exiting the discharge ends of the scoops.

Referring to FIG. 12, one specific implementation of a fluid column in accordance with the preferred embodiments includes multiple discharge tubes 126 with atomizers 128 that produce atomized liquid 710. The atomized liquid 710 is one suitable form for light-dispersing material within the scope of the preferred embodiments. The light plate 160 includes multiple light-producing elements that produce light 1210 as shown. The mounting plate 142 of the rotational assembly is preferably transparent or translucent, thereby allowing the light 1210 to pass through into the hollow chamber 130 as shown to contact the light-dispersing material. The rotation of the rotational assembly causes the scoops 146 to collect both air 410 and the atomized liquid 710, and to direct both of these into the hollow chamber 130. The flow out the discharge ends of the scoops may be straight, as shown at 1220, or may be in a vortex, as shown at 1230. The fluid flows out of the discharge ends of the scoops into the hollow chamber 130 as the rotational assembly rotates. As a result, a the apparent path of the mixture exiting from each scoop is a spiral path, as depicted in FIG. 12 at 1240. The spiral path of fluid flow allows a column of fluid to be projected a considerable distance above the hollow chamber.

Figure 13:
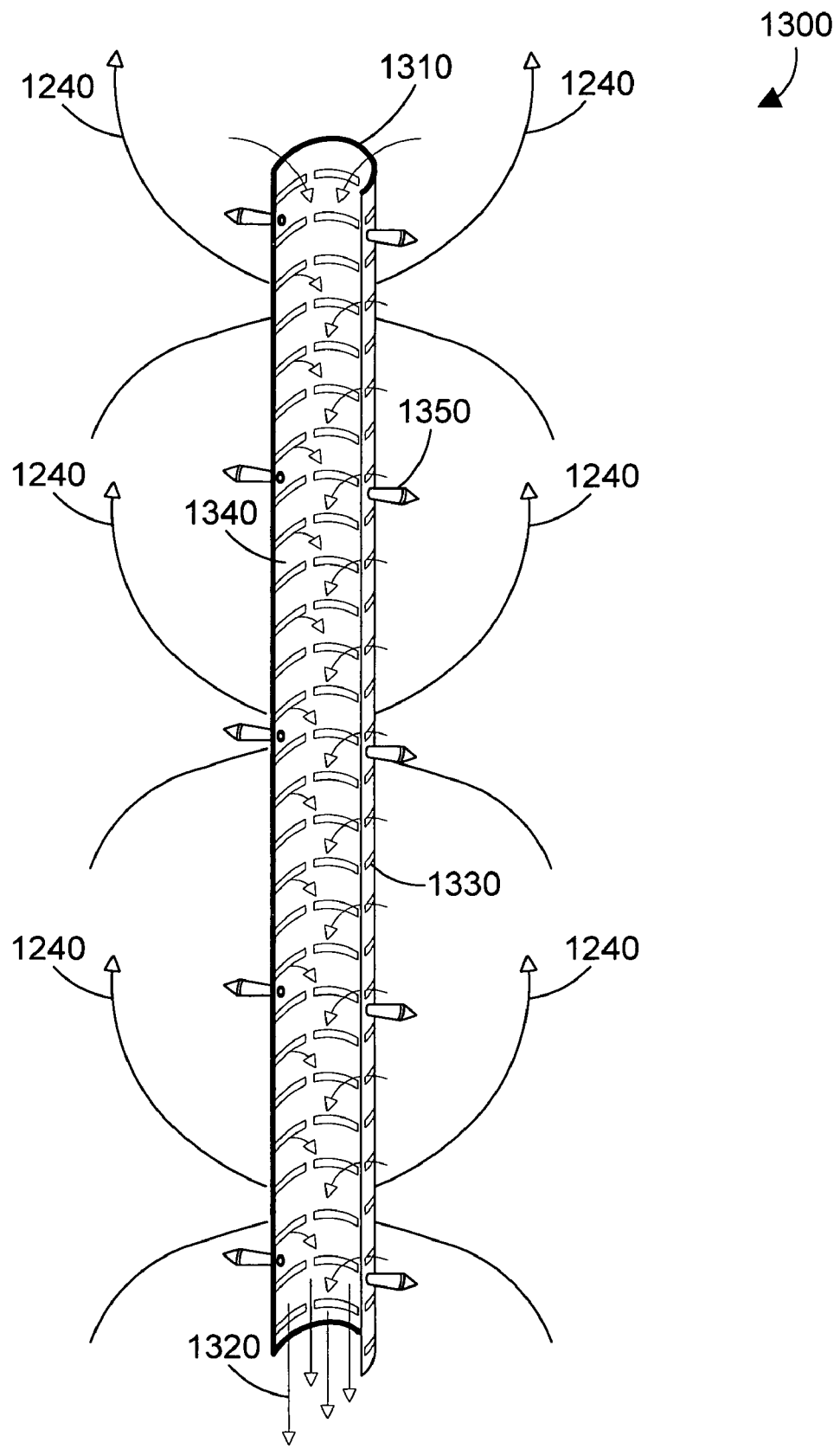
FIG. 13 is a cut-away view of a structure that may be placed in the center of the hollow chamber to enhance the optical effects of the fluid column projection apparatus of the preferred embodiments.

The length and stability of the fluid column projected above the hollow chamber can be further enhanced with the use of a central "stinger" 1300 as depicted in FIG. 13. Note that the stinger 1300 is a cylindrical tubular member that is shown cut-away along its length in FIG. 13 for the purpose of illustration. Stinger 1300 creates a low pressure center within the projected column flow by a perforated tube 1310 placed in the central axis of the flow and having a discharge end 1320 that evacuates fluid in the tube and results in air intake from without the tube 1310 through perforations 1330 in the wall of the tube 1310. The tube 1310 of stinger 1300 can be either open at the end as shown in FIG. 13 or can be terminated with a complete or partial closure. This intake function maintains the central low pressure area within the central axis of the fluid projection column 1240, toward which the fluid column 1240 will tend. If the central stinger is bent, either permanently or flexibly, the column will follow the associated curvature. The result of this embodiment is a light column that surrounds a central stinger, even if the stinger is permanently bent or being flexed. The evacuation flow 1320 of the stinger can be fed partially or wholly into hollow chamber 130, or could be evacuated to the outside of the hollow chamber 130. In the case of an embodiment with a suspended intake, air is drawn into an element located at a distance from the outflow of the hollow chamber 130 without any mechanical element necessarily being within the intervening fluid column. The air intake of the suspended intake element can be fed partially or wholly to the intake of hollow chamber 130. Note that the stinger 1300 may be wholly contained within the hollow chamber, may be partly within the hollow chamber and partly extending above the hollow chamber, or may be completely above the hollow chamber.

Stinger 1300 may include light sources 1350. Light sources 1350 can have, individually or collectively, any selected color, brightness, and/or modulation as produced by any suitable technology, including without limitation bulbs, lasers, light-emitting diodes (LEDs), organic LEDs (OLEDs), electroluminescent (EL) panels, fluorescent tubes, etc.

Referring back to FIG. 12, the scoops 146 are preferably located at the periphery of the mounting plate 142. The result is that light 1210 entering the hollow chamber 130 contacts the fluid exiting the discharge ends of the scoops 146, which preferably includes light-dispersing material. Note that light-dispersing material within the scope of the preferred embodiments extend to any suitable items that may be injected into the fluid flow to catch light. Examples of light-dispersing material include without limitation glitter, foil, fiberglass, bubbles, paper, plastic bits, powder, ice crystals, non-water liquid droplets, and entrained dust particles. Fluorescent materials may also be added, which would allow special optical effects to be achieved by the introduction of an optical pumping source such as ultraviolet light. The light-dispersing materials are used to scatter the light, thereby producing a visible column of light that may be projected a considerable distance above the hollow chamber 130.

The degree of scatter, the color of scatter, and the associated length of the light scattering effect (length of light column) are, among other factors, dependent on particle sizes, particle composition, particle number densities, and strength of the light sources, all of which can be controlled within the scope of the preferred embodiments. In this regard it should be noted that the invention also incorporates embodiments wherein the fluid column is illuminated from without the column with every sort of lighting, including but not limited to, modulated and unmodulated, mixed and/or combined, coherent and incoherent light of a visible and/or non-visible nature.

Control of the elements within the invention can include spatial and temporal events. For example (though not intended as a limiting example), the introduction of the scattering particles into the column need not be continuous. Using valves and/or other closure elements in the aerosol production system, the production of scattering particles can be interrupted in a selected temporal manner, in any selected line, and/or in any combination of selected lines, including all lines simultaneously. This can produce various display appearances. Likewise, the lights can be changed individually or in combination as appropriate to the desired effect.

Figure 14:
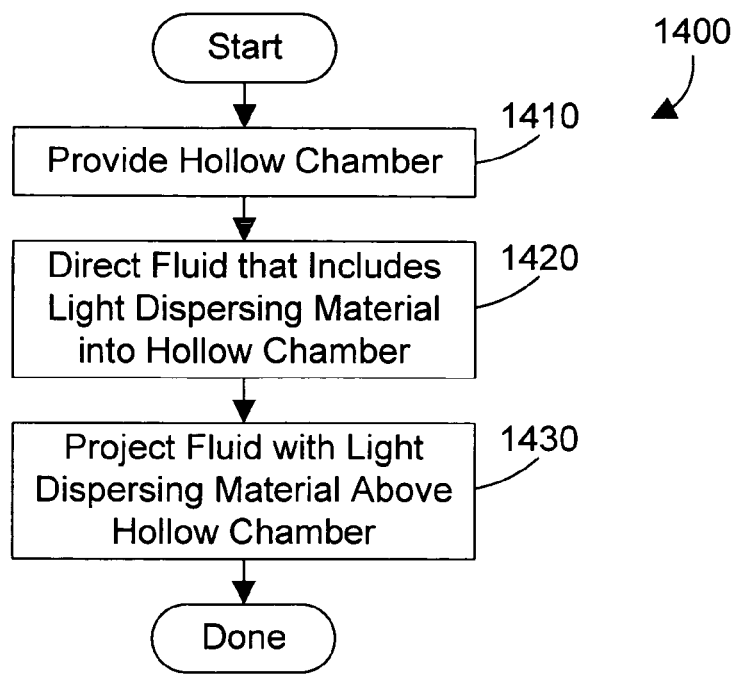
FIG. 14 is a flow diagram of a process for creating an optical effect within the scope of the preferred embodiments.
Figure 15:
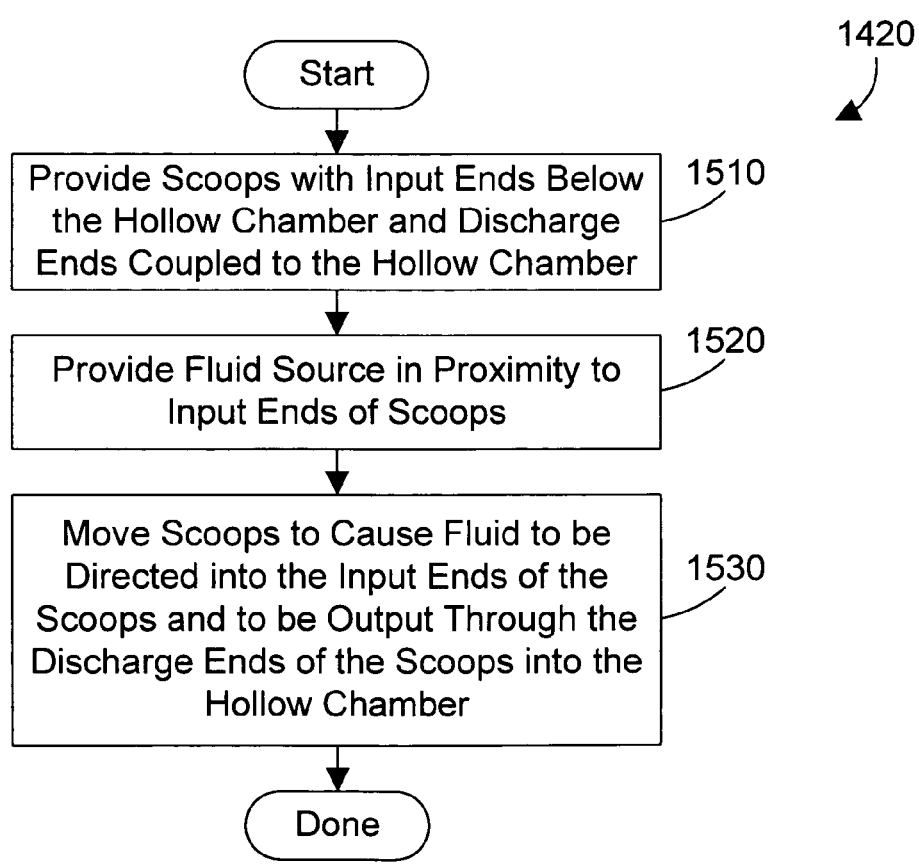
FIG. 15 is a flow diagram showing one specific implementation for step 1420 in FIG. 14 within the scope of the preferred embodiments.

Referring to FIG. 14, a method 1400 in accordance with the preferred embodiments provides a hollow chamber (step 1410). Fluid that includes light-dispersing material is then directed into the hollow chamber (step 1420). The fluid is then projected above the hollow chamber (step 1430). The result is a light column that is projected above the hollow chamber a considerable distance, thereby providing a projected column of light that provides a desired optical effect. Referring to FIG. 15, method 1420 is one specific implementation within the scope of the preferred embodiments for step 1420 in FIG. 14. Method 1420 provides scoops with input ends below the hollow chamber and discharge ends coupled to the hollow chamber (step 1510). A fluid source is then provided in proximity to the input ends of the scoops (step 1520). The scoops are then moved to cause fluid to be directed into the input ends of the scoops and to be output through the discharge ends of the scoops into the hollow chamber (step 1530). In this manner, a desired optical effect within the hollow chamber is achieved.

The preferred embodiments include thermodynamic effects created by constructions, expansions, compressions and other influences imposed on the air, particles, and their mixture. Such effects include, but are not limited to, heating, cooling, condensation, and vaporization. As an example, moisture-saturated air, naturally occurring and/or artificially produced, can exit the scoops into the hollow chamber, causing cooling by expansion to a temperature at which condensation will occur, thereby producing light-dispersing particles without the need for aerosol-generating equipment. This simple example, as well as other thermodynamic effects, are expressly within the scope of the preferred embodiments.

External heading and cooling can also be used. For example, air could be heated before being collected by the scoops to take advantage of the buoyancy of heated air that will help its vertical rise when ejected from the discharge ends of the scoops into the hollow chamber.

The preferred embodiments may includes appropriate drainage and/or cleaning means for liquid accumulation during condensation and direct accumulation during operation, including deposition during the flow of the light-dispersing material.

The scoops can be fitted with partially and/or completely closable apertures. Modulation of flow rate available via such apertures can be used for several purposes. For example, the air can be flowed in a controlled manner through the various tubes in a manner producing organ-like and other sounds by direct interaction with the scoops and hollow chamber, and/or by interaction between the various airflows, and/or by temporal modulation within individual or collective tubes that have been fitted with devices (like whistles and flutes) that create sound by way of airflow.

The hollow chamber 130 can be made to change shape such that it produces various degrees of directivity along the axis of the column. For example, the side walls of the hollow chamber could be made of interleaved pieces that are in a cylindrical configuration in the fully closed position, but allow the side walls to open at an outward angle as if the side walls were petals of a flower opening up. In the alternative, the side walls of the hollow chamber could be made of an elastic material, and rings could expand the elastic material to dynamically change the shape of the hollow chamber. In addition, the insertion of a suitable shape, such as a downward-pointing conical shape at the outflow of hollow chamber, will also affect the projected fluid column. In sum, the preferred embodiments expressly extend to any suitable way to vary the flow of fluid out of the hollow chamber to achieve dynamic control of the size and shape of the fluid column.

Changes to the hollow chamber may also be used to produce various openings for the purpose of sound production. Further, the entire assembly, and/or its associated parts, can be tilted, permanently or variably, to create various directive effects.

The projected flow from the fluid column projection apparatus will produce various new opportunities. One such opportunity is a unique "supportive capture" for the elevation of objects such as lightweight spheres. This is like the levitation of ping-pong balls in the outflow of an upturned vacuum cleaner tube, an arrangement used for gathering attention for sales of vacuum cleaners. However, with the preferred embodiments, the flow characteristics are considerably different. The preferred embodiments expressly extend to such supportive capture and similar applications.

As an additional note it should be understood that the hollow chamber may have any suitable shape within the scope of the preferred embodiments. For example, although the figures show a cylindrical hollow chamber, square, rectangular, oval, spherical, stars, conical, and other shapes, as well as any and all combinations, are within the scope of the preferred embodiments.

While the specific configurations illustrated herein show a rotational assembly below the hollow chamber, the preferred embodiments expressly extend to a light column apparatus that has a rotational assembly in any suitable physical relationship with the hollow chamber. In other words, the light column apparatus shown in FIG. 1 could be turned upside down within the scope of the preferred embodiments.

The preferred embodiments produce a stable column of fluid (gaseous and/or liquid) that can be projected a considerable distance away from its point of origin. This is achieved by direct introduction of fluid rotations and/or by rotational paths of nozzle exits in the outflow of fluids through tubes. Therefore, rotational character (vortex) is introduced by using rotation of mechanical nozzles, by using twists in the discharge ends of the scoops, by using a vortex-generating wedge within the flow, by using twisted channeling within one or more tubes, or by any combination of the aforementioned techniques.

Applications of a preferred embodiment include, but are not limited to: production of light columns for decorative or other purposes; projection of hot, neutral or cold air for further penetration of air conditioning into an area away from the exit vent of the air, or for production of water columns. The specific examples presented herein show the production of a light column using air as a first fluid and an atomized liquid as a second fluid that forms the light-dispersing material. However, the preferred embodiments expressly extend to the production of a fluid column using any suitable number and types of fluids.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

What is claimed is:

1. An apparatus comprising:
   at least one hollow chamber;
   a plurality of scoops, each scoop having an input end, a discharge end, and a hollow passage extending from the input end to the discharge end, wherein the input end of each of the plurality of scoops is outside the at least one hollow chamber and the discharge end of each of the plurality of scoops is coupled to the at least one hollow chamber; and
   a fluid source that releases a fluid in proximity to the input ends of the plurality of scoops such that movement of the plurality of scoops causes the fluid to be directed into the input ends of the plurality of scoops and to be output through the discharge ends of the plurality of scoops into the hollow chamber.

2. The apparatus of claim 1 wherein the fluid comprises light dispersing particles.

3. The apparatus of claim 2 wherein the light dispersing particles comprise liquid droplets.

4. The apparatus of claim 2 wherein the light dispersing particles comprise powder.

5. The apparatus of claim 2 wherein the light dispersing particles comprise reflective particles.

6. The apparatus of claim 1 further comprising a motor coupled to the plurality of scoops such that the plurality of scoops are rotated by the motor.

7. The apparatus of claim 1 further comprising an atomizer coupled to the fluid source for atomizing the fluid in proximity to the input ends of the plurality of scoops.

8. The apparatus of claim 1 wherein the at least one hollow chamber comprises at least one vertical cylindrical hollow chamber.

9. The apparatus of claim 1 wherein the fluid exiting the discharge ends of the plurality of scoops is projected outside of the at least one hollow chamber.

10. The apparatus of claim 9 further comprising at least one light source that illuminates the projected fluid outside of the at least one hollow chamber.

11. The apparatus of claim 1 further comprising at least one light source that illuminates the at least one hollow chamber.

12. The apparatus of claim 1 further comprising a tubular member that includes a plurality of openings for receiving fluid and a discharge end for directing the fluid outside of the tubular member.

13. A process for creating an optical effect, the process comprising the steps of:
   providing at least one hollow chamber;
   providing a plurality of scoops, each scoop having an input end, a discharge end, and a hollow passage extending from the input end to the discharge end, wherein the input end of each of the plurality of scoops is outside the at least one hollow chamber and the discharge end of each of the plurality of scoops is coupled to the at least one hollow chamber;
   providing a fluid source that releases the fluid in proximity to the input ends of the plurality of scoops; and
   moving the plurality of scoops to cause the fluid to be directed into the input ends of the plurality of scoops and to be output through the discharge ends of the plurality of scoops into the hollow chamber.

14. The process of claim 13 wherein the light dispersing particles comprise liquid droplets.

15. The process of claim 13 wherein the light dispersing particles comprise powder.

16. The process of claim 13 wherein the light dispersing particles comprise reflective particles.

17. The process of claim 13 further comprising the step of atomizing the fluid in proximity to the input ends of the plurality of scoops.

18. The process of claim 13 wherein the at least one hollow chamber comprises at least one vertical cylindrical hollow chamber.

19. The process of claim 13 further comprising the step of projecting the fluid exiting the discharge ends of the plurality of scoops outside of the at least one hollow chamber.

20. The process of claim 19 further comprising the step of illuminating the projected fluid outside of the at least one hollow chamber.

21. The process of claim 13 further comprising the step of illuminating the at least one hollow chamber.

22. The process of claim 13 further comprising the step of providing a tubular member that includes a plurality of openings for receiving fluid and a discharge end for directing the fluid outside of the tubular member.

23. An apparatus comprising:
   at least one hollow chamber;
   a rotational assembly having a plurality of scoops, each scoop having an input end, a discharge end, and a hollow passage extending from the input end to the discharge end, wherein the input end of each of the plurality of scoops is outside the at least one hollow chamber and the discharge end of each of the plurality of scoops is within the at least one hollow chamber;
   a motor coupled to the rotational assembly that rotates the rotational assembly when the motor runs;
   at least one light source that transmits light into fluid exiting the at least one hollow chamber;
   a first fluid source that releases a fluid in proximity to the input ends of the plurality of scoops such that movement of the plurality of scoops causes the fluid to be directed into the input ends of the plurality of scoops and to be output through the discharge ends of the plurality of scoops into the hollow chamber; and
   a second fluid source in proximity to the input ends of the plurality of scoops, the second fluid source comprising an atomizer for atomizing a second fluid.

* * * * *